United States Patent [19]

Peev et al.

[11] 4,110,547

[45] Aug. 29, 1978

[54] METHOD OF STEELMAKING WITH DIRECT CURRENT

[75] Inventors: Vassil Georgiev Peev; Alexander Yordanov Valchev; Nikolay Georgiev Bakalov, all of Sofia, Bulgaria

[73] Assignee: DSO "Cherna Metalurgia", Sofia, Bulgaria

[21] Appl. No.: 678,664

[22] Filed: Apr. 20, 1976

[30] Foreign Application Priority Data

Apr. 25, 1975 [BG] Bulgaria ................................. 29783

[51] Int. Cl.² .................... H05B 7/144; H05B 7/20
[52] U.S. Cl. ................................................ 13/11
[58] Field of Search ................... 13/9, 11, 34, 9 ES

[56] References Cited

U.S. PATENT DOCUMENTS

| 3,493,364 | 2/1970 | Nakanishi | 13/9 ES |
| 3,835,230 | 9/1974 | Yordanov et al. | 13/9 |

*Primary Examiner*—R. N. Envall, Jr.
*Attorney, Agent, or Firm*—Karl F. Ross

[57] ABSTRACT

A method for steelmaking with direct current in which, during melting in an arc furnace, the contact anodes are connected by contact to the iron material, and the electric arc is formed between the latter and the movable cathodes. After the contact anodes attain the slag, the further burning of the electric arc between the molten metal and the movable cathodes is effected so that the working ends of the contact anodes remain immersed in the slag.

3 Claims, 3 Drawing Figures

METHOD OF STEELMAKING WITH DIRECT CURRENT

This invention relates to a method of steelmaking in a DC arc furnace.

A method of steelmaking with direct current is known in which the melting is carried out in an arc furnace by an electric which burns between movable cathodes and the iron material (solid or liquid), the material being electrically connected by contact with movable contact anodes. A drawback of this method is the considerable consumption of electric energy and of water for cooling the contact anodes.

It is, therefore an object of the present invention to provide a method for steelmaking with direct current, in which the consumption of electric energy and of water for cooling the contact anodes is reduced.

This object is achieved by a method for steelmaking with direct current, wherein, during the melting in the arc furnace, the contact anodes are in engagement with the iron material, while the electric arc is formed between the iron material and the movable cathodes. When the greatest part of the iron material is melted, the further burning of the arc between the molten material (metal) and the movable cathodes during the remainder of the metallurgical process is effected after the displacement of the movable contact anodes, until the working ends of the latter are immersed in the slag over the molten metal.

The method of steelmaking with direct current, in accordance with the present invention, permits the use in the space of the arc furnace of one and the same movable contact anodes for melting the iron material, as well as during the remainder of the metallurgical processes of the heat. The same method is also applicable for prior art cases in which, when during the melting of the charged material, there are used movable contact anodes, introduced through the roof of the arc furnace, while the remaining metallurgucal processes are effected by means of movable contact anodes, which are introduced through side holes of this same arc furnace and their working ends are immersed into slag.

SPECIFIC DESCRIPTION

Figure 1:
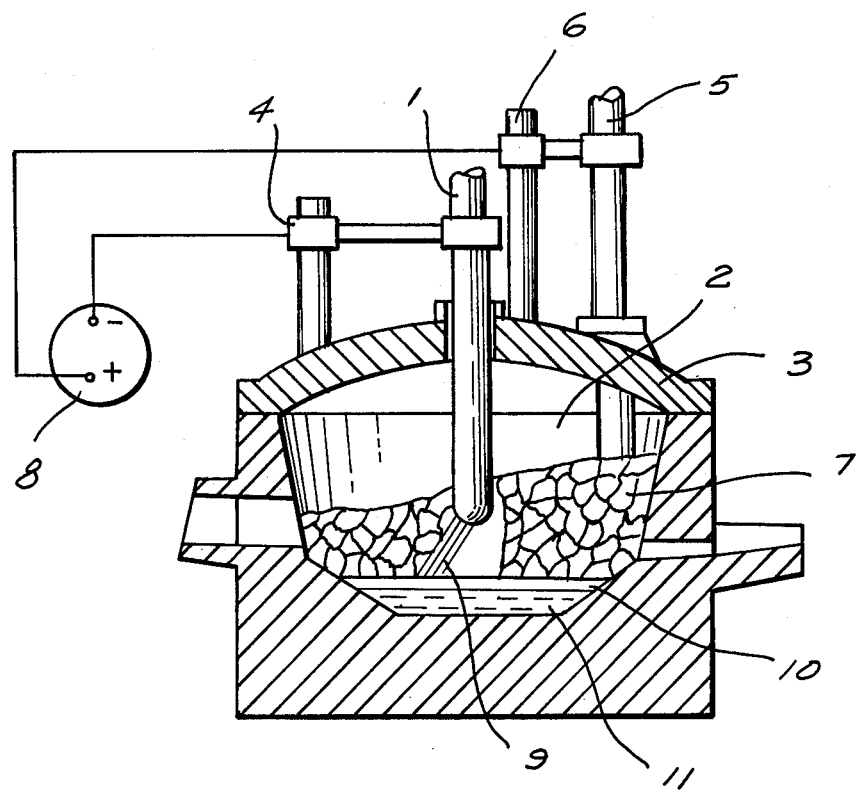
FIG. 1 is a cross-sectional illustration of an arc furnace during the melting of the iron material, in which the melting is effected by an electric arc burning between a movable cathode and the charged iron material, engaged by a movable contact anode, introduced into the furnace space through a hole in the roof of the furnace.

The arc furnace for steelmaking with direct current, shown in FIG. 1, comprises a carbon cathode 1, introduced into the furnace space 2 through a hole in the roof 3. By means of a reversible driving unit 4, the carbon cathode 1 is moved upward and downward. In the furnace space 2 there is introduced through a hole in the roof 3 a movable carbon contact anode 5, driven by a reversible driving unit 6 for upward and downward motion, as well as for its connection by contact to the iron material 7. The negative pole of the DC source 8 is connected to the movable carbon electrode 1, while the positive pole is connected to the movable carbon anode 5.

The method of the invention is effected as follows:

The arc furnace is charged with iron material 7. The movable carbon contact anode 5 is moved downwards by means of the driving unit 6, its front end touches the iron material 7 effecting thus a contact connection with it. Then movable carbon cathode 1 begins to move downwards, too, and when its lower and reaches the iron material 7, an electric arc 9 is ignited between the carbon cathode 1 and the iron material 7. Further, the melting is then effected in the known way. The arc furnace can be charged up one or more times with iron material 7 until the necessary quantity for one heat is assembled. When the iron material from the last charge is being melted, the movable carbon contact cathode 5 is maintained in contact with the iron material 7, until it reaches the surface of the slag 10. The electric arc 9 burns between the movable carbon cathode 1 and the molten metal 11 until all of the iron material 7 is melted.

Figure 2:
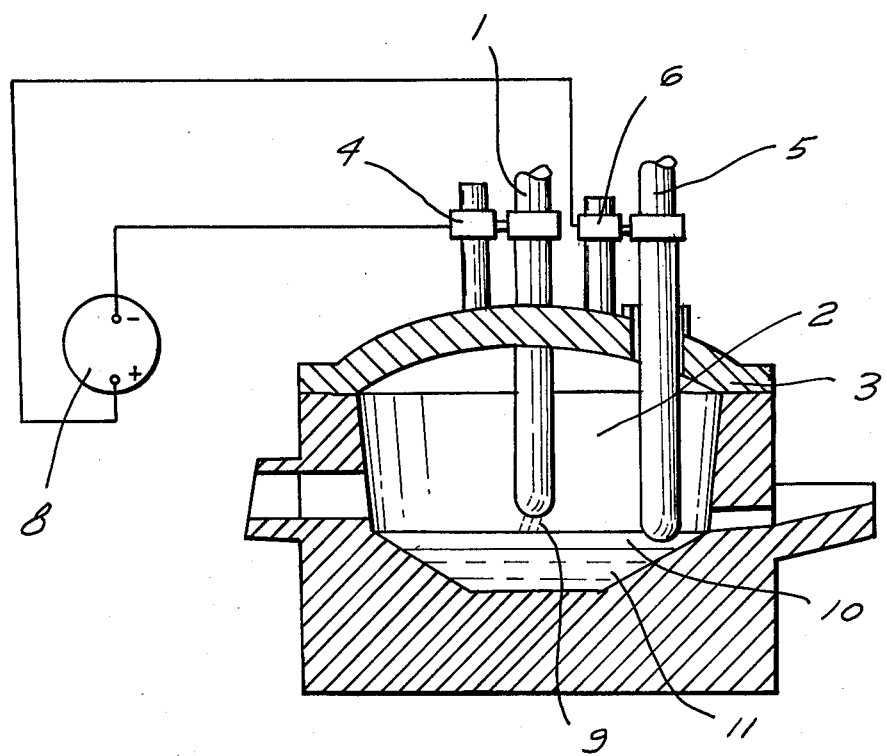
FIG. 2 shows the same cross-sectional view of the arc furnace during the remaining metallurgical processes of the heat.

The heating during the metallurgical processes carried out later in the arc furnace as illustrated in FIG. 2, where the action of the arc 9 is maintained between the movable carbon cathode 1 and the molten metal 11 by the movable carbon contact anode 5, the working end of which is retained constantly immersed into the slag 10 by means of the driving unit 6.

Figure 3:
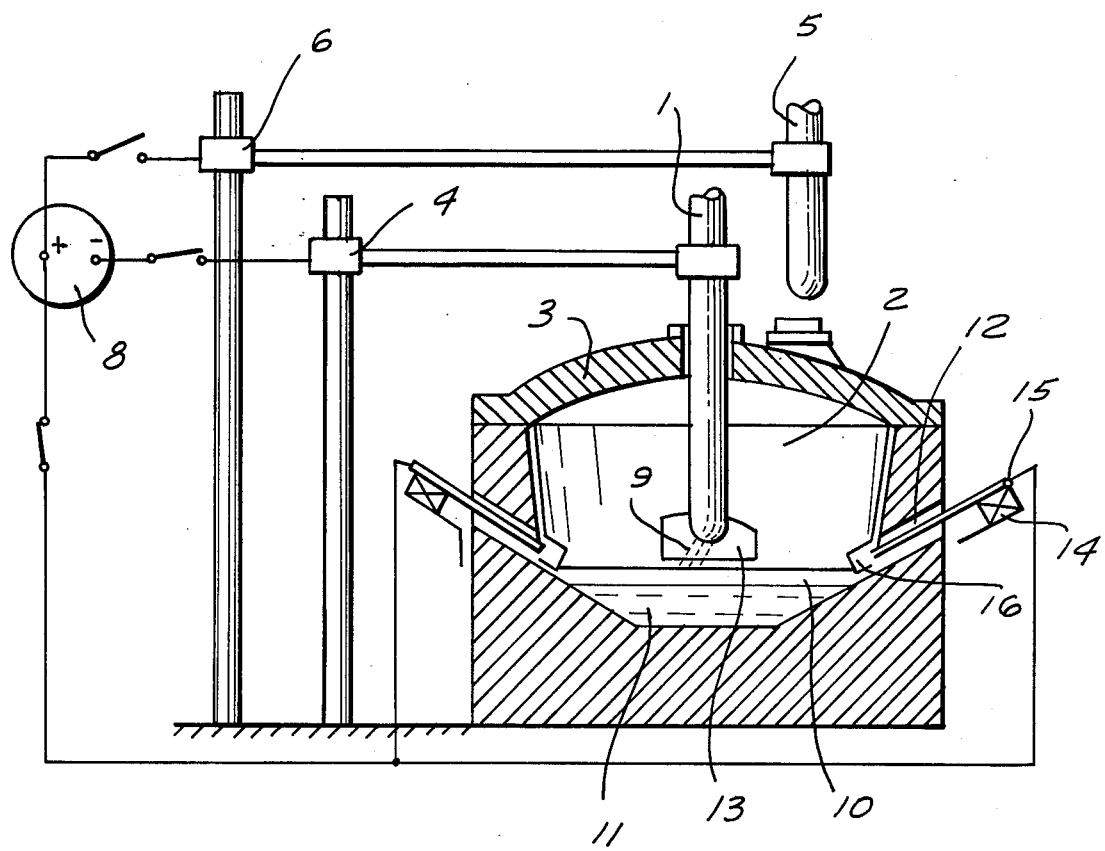
FIG. 3 illustrates is a cross-sectional view of an arc furnace during the metallurgical processes effected by an electric arc burning between a movable cathode and two movable contact anodes, which are introduced into the furnace space through side holes, disposed higher than the threshold of the furnace door, their working ends being immersed in the slag.

FIG. 3 illustrates an arc furnace in which the melting of the iron material (not shown in the figure) is effected by an electric arc (not shown in the figure) burning between a movable carbon cathode 1 and the iron material, the latter being connected by contact to a movable carbon contact anode 5, which is reversibly driven upward and downward by a driving unit 6. The metallurgical processes in this arc furnace can be effected by a movable carbon cathode 1 and a movable carbon contact anode 5, similar to the preferred embodiment illustrated in FIG. 2.

The illustrated design of the arc furnace in FIG. 3 permits furthermore to carry out the metallurgical processes of the heat by heating with the electric arc 9, burning between the movable carbon cathode 1 and the molten metal 11, while in the slag 10 of the latter there are immersed the working ends 16 of two movable contact anodes 15. The working ends of the movable contact anodes 15 are immersed by means of the reversible driving unit 14 into the slag 10 over the molten metal 11 until the termination of the metallurgical processes. The movable carbon contact anode 5 may not take part after the melting in the remaining metallurgical processes, and for this reason it can be retracted by means of the reversible driving unit 6 ouside the space 2 of the furnace.

What we claim is:

1. A steel-making method which comprises the steps of:
    (a) introducing at least one charge of solid iron material into an electric arc furnace;
    (b) engaging said charge with a contact electrode while advancing an arc electrode toward said charge and passing a direct electric current between said electrodes to generate an arc between said arcing electrode and said material to melt said material and forming a bath of molten material overlain by a slag layer;

(c) maintaining said contact electrode in engagement with said material during the arc melting thereof and at least until all of said material is melted;

(d) immersing said contact electrode only into said slag layer while spacing said contact electrode from the bath below said slag layer; and (e) subjecting a molten material in said furnace to a further metallurgical process in the presence of an arc passing between said arcing electrode and said slag layer.

2. The method defined in claim 1 wherein said electrode immersed only in said slag layer is said contact electrode.

3. The method defined in claim 1 wherein said electrode immersed only in said slag layer is a further electrode introduced laterally into said furnace.

* * * * *